June 12, 1956 — J. W. WILKINSON — 2,750,042
FILTERS
Filed March 1, 1954 — 2 Sheets-Sheet 1

INVENTOR.
James W. Wilkinson
BY Otto A. Earl
Attorney.

June 12, 1956  J. W. WILKINSON  2,750,042
FILTERS
Filed March 1, 1954  2 Sheets-Sheet 2
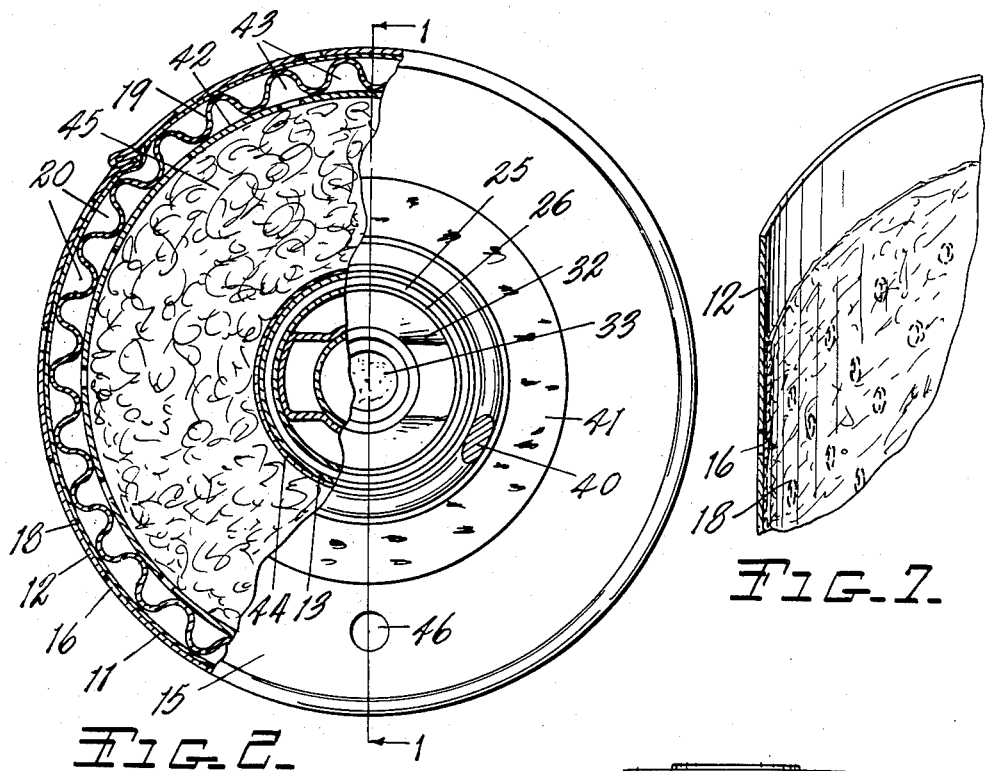
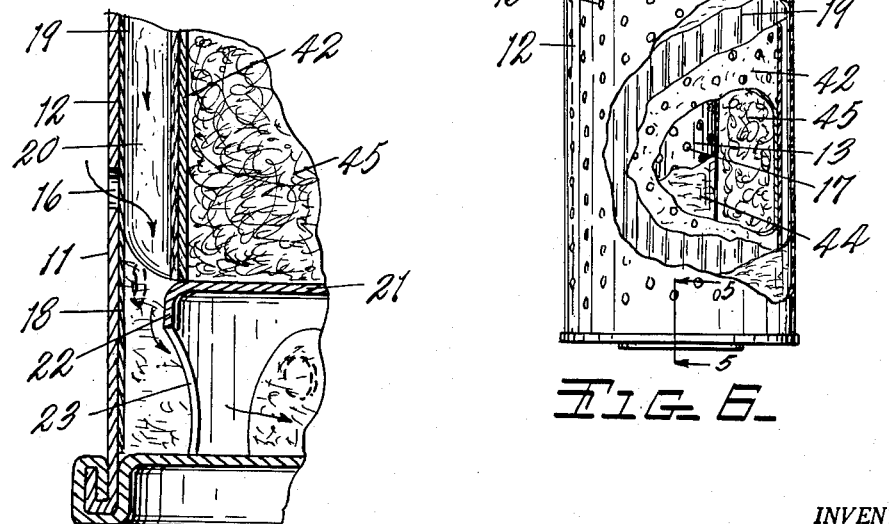
INVENTOR.
James W. Wilkinson
BY
Attorney

United States Patent Office 2,750,042
Patented June 12, 1956

2,750,042
FILTERS

James W. Wilkinson, Hastings, Mich., assignor to Hastings Manufacturing Company, Hastings, Mich., a corporation of Michigan Application March 1, 1954, Serial No. 413,353

17 Claims. (Cl. 210—131)

This invention relates to improvements in filters. The invention relates particularly to filters and filter cartridges for use in filtering the lubricant of internal combustion engines and is of the type generally designated as the "full flow" filter.

The main objects of this invention are:

First, to provide a filter for use in filtering lubricant of internal combustion engines and the like which is adapted to permit the passage therethrough of a large volume of lubricant and is unlikely to become clogged.

Second, to provide a filter in which coarse material is filtered from the larger free flowing volume of the lubricant by means of one filtering medium disposed in one passageway in the filter and the fine material is filtered from a relatively smaller amount of the lubricant by means of another filtering medium disposed in another passageway in the filter, the two filtering mediums coacting in the effective filtering of the lubricant while permitting flow of a large volume of lubricant.

Third, to provide a filtering cartridge having these advantages which is comparatively simple and economical to produce and at the same time is highly efficient.

Objects relating to details and economies of the invention will appear from the description to follow. The invention is pointed out in the claims.

A filter which embodies the features of the invention is clearly illustrated in the accompanying drawing, in which:

Fig. 2 is an enlarged fragmentary plan view partially in horizontal section.

Fig. 5 is an enlarged fragmentary view in section on a line corresponding to line 5—5 of Fig. 6.

Fig. 6 is a fragmentary side elevation view of the cartridge, portions being broken away to illustrate the relation of parts.

Fig. 7 is a fragmentary inside perspective view of the outer cartridge wall and the filtering lining therefor.

Figures 1, 3, 4:
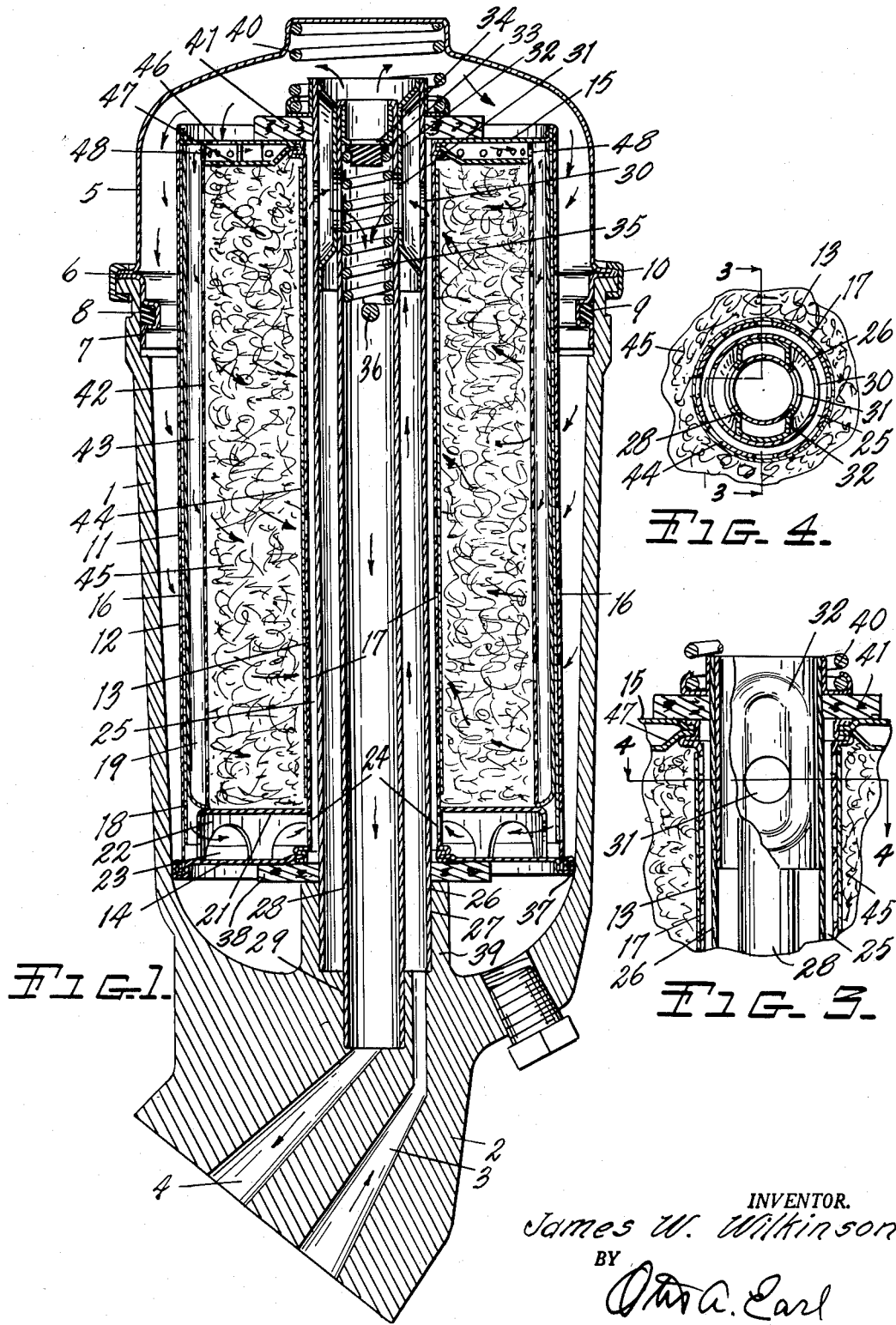
Fig. 1 is a vertical section of a filter embodying the invention taken on a line corresponding to line 1—1 of Fig. 2.
Fig. 3 is an enlarged fragmentary view on a line corresponding to line 3—3 of Fig. 4.
Fig. 4 is a fragmentary view in section on a line corresponding to line 4—4 of Fig. 3.

The embodiment of the invention illustrated in the accompanying drawing comprises the casing body 1 which is of cylindrical section and has downwardly tapered side walls. The base or bottom 2 of the casing is provided with an inlet passage 3 and an outlet passage 4. The cover 5 is provided with an outturned annular flange 6 which rests on the edge of the body member 1 and has a portion 7 fitting within the upper end of the body member and provided with an outwardly facing gasket seat 8 for the gasket 9. The cover is secured by means of the clamping ring or collar 10.

The casing is designed to be connected to a lubricant circulating system such for example as that of an internal combustion engine in which the lubricant is circulated under substantial pressure.

The cartridge of this invention designated generally by the numeral 11 is designed to be removably mounted within the casing. The cartridge comprises an outer foraminate wall 12 and an inner foraminate wall 13 disposed in radially spaced relation and fixedly connected by the bottom 14 and the annular top 15 which have seamed connection to the inner and outer walls; these parts are formed of sheet metal and the walls are sufficiently rigid to hold their shape. The holes in the outer wall 12 are indicated at 16 and those of the inner wall at 17. These holes are desirably of substantial size so that they are not likely to become clogged by any material flowing therethrough. The outer wall 12 is provided with a filtering lining 18 which is desirably a nonwoven fabric sheet through which the lubricant may flow quite freely but is effective in preventing passage of the coarser material carried by the lubricant. The term "nonwoven" is used to designate a fabric which is formed by felting materials together as distinguished from weaving strands or threads. The material commercially known as "Visking" as hereinafter described has been found to be highly satisfactory. Other material accomplishing this result may be used.

This sheet material is supported on the inner side of the outer wall by means of the corrugated sleeve 19 which is sleeved within the outer wall in supporting relation to the filtering lining. This is imperforate material and may be formed of a sheet of fibrous stock which is relatively impervious to the lubricant.

The sleeve 19 coacts with the filter lined outer wall to provide a plurality of vertical discharge passages 20 for the lubricant which passes through the filtering lining. These passages open radially outwardly of the inner bottom member 21 of the cartridge which is provided with a downturned peripheral flange 22 having openings 23 therein. The lubricant discharged from the passages 20 passes through these openings 23 and through openings 24 in the inner cartridge wall 13 to discharge to the passage 25 constituted by the wall 13 and the inlet tube 26. The inlet tube 26 is mounted in a seat 27 provided therefor on the bottom of the casing. An outlet tube 28 is mounted in the seat 29 provided therefor in the casing bottom 2 in communication with the outlet passage 4. The inlet passage 3 delivers to the bottom of the inlet tube.

The passage 25 is connected at its upper end to the outlet tube by passage through openings 30 in the inlet tube and openings 31 in the outlet tube. The partition or bridging members 32 surround these openings 30 and 31 or close them off from the inlet. The outlet tube is provided with a valve 33 at its upper end seating against the valve seat member 34 and yieldingly urged against its seat by the spring 35 supported by the pin 36 disposed transversely of the outlet tube, see Fig. 1. The purpose of this valve is to allow or filter by-pass circulation in the event the filter should become inoperative or in the event that too much back pressure should develop in the filter.

It will be noted that the outer wall of the cartridge is spaced from the casing wall and that the bottom gasket 38 of the cartridge is seated upon the internal flange 39 of the bottom and is urged against that seat by the spring 40 within the top or cover 5, which spring is in thrust engagement with the upper gasket 41.

A foraminate filter chamber wall 42 is disposed on the inner side of the corrugated sleeve 19 and is radially outwardly supported thereby and coacts therewith to provide a plurality of vertical distributing passages 43. The inner wall of the cartridge is provided with a fabric covering 44, which prevents migration of the finer filtering medium through holes 17.

This filtering material 45 is preferably unkiered cotton linters having their natural content of wax. Such linters do not absorb water and while compacted to a substantial degree the liquid may flow uniformly through the same. The passages 43 distribute the lubricant throughout this filtering body. These passages 43 are connected to the lubricant chamber through the opening 46 in the top wall of the cartridge. A distributing plate 47 is disposed below the top wall and the filter chamber wall is provided with a plurality of holes 48 above the distributing plate through which the oil is delivered to the distributing passages 43. The flow resistance of the filtering medium 45 as compared to the flow resistance of the lining for the outer wall result in what might be called a substantial pressure drop so that a much larger volume of filtered liquid passes through the filtering lining than passes through the filtering medium in the filtering chamber. The result is that there is a full flow of liquid through the filter, some conditions requiring circulation of a large amount of filtered liquid. At the same time both the coarse and the finer materials are effectively removed as the liquid is repeatedly circulated through the filter.

As stated, I preferably use a nonwoven filtering sheet as a liner for the outer cartridge wall and one which permits a relatively free flow of liquid therethrough, the nonwoven sheet material known as Visking being suitable for the purpose. Applicant understands that this is formed of rayon which has little or no affinity for the lubricant. As previously described this material is of a texture to prevent passage of relatively large particles but to permit passage of relatively small particles. As stated other materials permitting quite free flow and at the same time screening the coarse materials may be used. The unkiered cotton linters are highly efficient in removal of the finer materials from the circulated liquid.

The cartridge may be formed as a unit but its operating relation to the casing or filtering chamber is important.

I have not attempted to show other embodiments or adaptations of the invention as it is believed the disclosure made will enable those skilled in the art to embody or adapt the same as may be desired.

Having thus described my invention what I claim as new and desire to secure by Letters Patent is:

1. In a filter, the combination with a closed casing having cylindrical downwardly tapering side walls and a bottom provided with inlet and outlet passages, of an inlet tube mounted on said bottom in communication with said inlet passage and discharging at the upper end of the chamber defined by the casing, an outlet tube disposed concentrically within said inlet tube and mounted on said bottom in communication with said outlet passage, said outlet tube being provided with a pressure actuated return flow valve at its upper end, a filter cartridge surrounding said inlet tube with its bottom edge contacting said casing side wall and comprising radially spaced foraminate outer and inner walls, the inner wall being spaced from said inlet tube and coacting therewith to provide a discharge passage, said inlet and outlet tubes having openings therein adjacent the upper ends thereof through which said discharge passage communicates with the outlet tube, partitioning walls between said inlet and outlet tubes surrounding the said openings therein and providing a passageway from said discharge passage to the outlet tube through the inlet passage between the inlet and outlet tubes, said inlet tube discharging into said casing above said partitioning walls, a top and an outer bottom wall connecting said inner and outer cartridge walls, an inner bottom member having a downturned flange supported on said outer bottom wall and having openings therein, said inner cartridge wall having openings below said inner bottom member for passage of fluid from below said inner bottom member to said discharge passage, a filter medium lining for said outer cartridge wall, a vertically corrugated sleeve disposed within said lining and coacting therewith to provide a plurality of outer vertical passages closed at their upper ends by said top wall, said passages opening at their lower ends adjacent the openings in the downturned flange for passage of fluid through said openings to below the inner bottom member below said inner bottom wall member, a foraminate filtering medium chamber wall disposed on the inner side of said sleeve and supported by the outwardly facing corrugations thereof against outward displacement and coacting with the inwardly facing corrugations thereof to provide a plurality of inner vertical distributing passages, a distributor plate mounted below and in spaced relation to the said top wall, the top wall having an opening therein above said distributor plate, the said foraminate filtering chamber wall projecting above and having an annular series of openings above said distributor plate discharging to said inner vertical distributing passages, and a filtering medium compacted in substantially uniform density between said inner cartridge wall and said filtering chamber wall, the flow resistance of such filtering medium being substantially greater than that of said filter lining to said outer cartridge wall whereby the flow of fluid through the filter lining is substantially greater than that through the filter medium, said filter lining constituting means to filter only relatively large particles from the fluid, said filtering medium constituting means to filter relatively small particles from the fluid.

2. In a filter, the combination with a closed casing having cylindrical downwardly tapering side walls and a bottom provided with inlet and outlet passages, of an inlet tube mounted on said bottom in communication with said inlet passage and discharging at the upper end of the chamber defined by the casing, an outlet tube disposed concentrically within said inlet tube and mounted on said bottom in communication with said outlet passage, said outlet tube being provided with a pressure actuated return flow valve at its upper end, a filter cartridge surrounding said inlet tube with its bottom edge contacting said casing side wall and comprising radially spaced foraminate outer and inner walls, the inner wall being spaced from said inlet tube and coacting therewith to provide a discharge passage, said discharge passage having a delivery connection to said outlet tube, top and bottom walls connecting said inner and outer cartridge walls, a filter medium lining for said outer cartridge wall, a vertically corrugated sleeve disposed within said lining and coacting therewith to provide a plurality of outer vertical passages closed at their upper ends by said top wall, said passages being connected at their lower ends to said discharge passage, a foraminate filtering medium chamber wall disposed on the inner side of said sleeve and supported by the outwardly facing corrugations thereof against outward displacement and coacting with the inwardly facing corrugations thereof to provide a plurality of inner vertical distributing passages, a distributor plate mounted below and in spaced relation to the said top wall, the top wall having an opening therein above said distributor plate, the said foraminate filtering chamber wall projecting above and having an annular series of openings above said distributor plate discharging to said inner vertical distributing passages, and a filtering medium compacted in substantially uniform density between said inner cartridge wall and said filtering chamber wall, the flow resistance of such filtering medium being substantially greater than that of said filter lining to said outer cartridge wall.

3. In a filter, the combination with a closed casing, and a bottom provided with inlet and outlet passages, of an inlet tube communicating with said inlet passage and discharging at the upper end of the chamber defined by the casing, an outlet tube disposed within said inlet tube and communicating with said outlet passage, said outlet tube being provided with a pressure actuated return flow valve at its upper end, a filter cartridge surrounding said inlet tube and comprising radially spaced foraminate outer and inner walls, the inner wall being spaced from said inlet tube and coacting therewith to provide a discharge passage, said inlet and outlet tubes having openings therein through which said discharge passage communicates with the outlet tube, a partition wall between said inlet and outlet tubes surrounding the said openings therein and constituting connections for the upper ends of the inlet and outlet tubes, a top and an outer bottom wall connecting said inner and outer cartridge walls, an inner bottom members spaced from said outer bottom wall, said inner cartridge wall having an opening below said inner bottom member to provide a passageway from beneath the inner bottom member to said discharge passage, a filtering lining for said outer cartridge wall, a vertically corrugated sleeve disposed within said lining and coacting therewith to provide a plurality of outer vertical passages closed at their upper ends by said top wall and opening at their lower ends to the space below said inner bottom wall member, a foraminate filtering medium chamber wall disposed in the inner side of said sleeve and supported by the outwardly facing corrugations thereof against outward displacement and coacting with the inwardly facing corrugations thereof to provide a plurality of inner vertical distributing passages having supply connection to said chamber, a fabric covering on the radially outer side of the inner cartridge wall, and a fibrous filtering medium compacted in substantially uniform density between said inner cartridge wall and said filtering chamber wall, the flow resistance of such filtering medium being substantially greater than that of said lining to said outer cartridge wall.

4. In a filter, the combination with a closed casing, and a bottom provided with inlet and outlet passages, of an inlet tube communicating with said inlet passage and discharging at the upper end of the chamber defined by the casing, an outlet tube disposed within said inlet tube and communicating with said outlet passage, said outlet tube being provided with a pressure actuated return flow valve at its upper end, a filter cartridge surrounding said inlet tube and comprising radially spaced foraminate outer and inner walls, the inner wall being spaced from said inlet tube and coacting therewith to provide a discharge passage, said discharge passage having a delivery connection to said outlet tube, a top and an outer bottom wall connecting said inner and outer cartridge walls, an inner bottom member spaced from said outer bottom wall, said inner cartridge wall having an opening below said inner bottom member to provide a passageway from beneath the inner bottom member to said discharge passage, a filtering lining for said outer cartridge wall, a vertically corrugated sleeve disposed within said lining and coacting therewith to provide a plurality of outer vertical passages closed at their upper ends by said top wall and opening at their lower ends to the space below said inner bottom wall member, a foraminate filtering medium chamber wall disposed in the inner side of said sleeve and supported by the outwardly facing corrugations thereof against outward displacement and coacting with the inwardly facing corrugations thereof to provide a plurality of inner vertical distributing passages having supply connection to said chamber, and a fibrous filtering medium compacted in substantially uniform density between said inner cartridge wall and said filtering chamber wall, the flow resistance of such filtering medium being substantially greater than that of said lining to said outer cartridge wall.

5. In a filter, the combination with a closed casing having cylindrical downwardly tapering side walls and a bottom provided with inlet and outlet passages, of an inlet tube mounted on said bottom in communication with said inlet passage and discharging at the upper end of the chamber defined by the casing, an outlet tube disposed within said inlet tube and mounted on said bottom in communication with said outlet passage, said outlet tube being provided with a pressure actuated return flow valve at its upper end, a filter cartridge surrounding said inlet tube and comprising radially spaced foraminate outer and inner walls, the inner wall being spaced from said inlet tube and coacting therewith to provide a discharge passage, said inlet and outlet tubes having openings therein through which said discharge passage communicates with the outlet tube, a partition wall between said inlet and outlet tubes surrounding the said openings therein and constituting connections for the upper ends of the inlet and outlet tubes, a top and an outer bottom wall connecting said inner and outer cartridge walls, an inner bottom member having a downturned flange supported on said outer bottom wall and having openings therein, said inner cartridge wall having openings below said inner bottom member to provide a passageway from beneath the inner bottom member to said discharge passage, a filtering medium lining for said outer cartridge wall, a vertically corrugated sleeve disposed within said lining and coacting therewith to provide a plurality of outer vertical passages closed at their upper ends by said top wall and at their lower ends to the space below said inner bottom wall member, a foraminate filtering chamber wall disposed on the inner side of said sleeve and supported by the outwardly facing corrugations thereof against outward displacement and coacting with the inwardly facing corrugations thereof to provide a plurality of inner vertical distributing passages having supply connections to the liquid discharged from said inlet tube, and a filtering medium between said inner cartridge wall and said filtering chamber wall, the flow resistance of such filtering medium being substantially greater than that of said lining to said outer cartridge wall.

6. In a filter, the combination with a closed casing, of an inlet tube discharging at its upper end to the chamber defined by the casing, an outlet tube disposed within said inlet tube to discharge at its lower end, a filter cartridge comprising radially spaced outer and inner walls, said outer wall constituting a filtering wall, a top wall and an outer bottom wall, the inner wall being spaced from said inlet tube and coacting therewith to provide a discharge passage, said discharge passage having a delivery connection at its upper end to said outlet tube, a vertically corrugated sleeve disposed inwardly of said outer filtering wall providing a plurality of outer vertical passages, a delivery connection from the lower ends of said outer vertical passages to the lower end of said discharge passage, a foraminate filtering chamber wall disposed on the inner side of said sleeve and supported by the outwardly facing corrugations thereof against outward displacement and coacting with the inwardly facing corrugations thereof to provide a plurality of inner vertical distributing passages, a distributor plate mounted below and in spaced relation to the top wall of the cartridge, the top wall having an opening therein above said distributor plate, the said foraminate filtering chamber wall projecting above and having an annular series of openings above said distributor plate discharging to said inner vertical distributing passages, and compacted filtering medium between said inner cartridge wall and said filtering chamber wall.

7. In a filter, the combination with a closed casing, of an inlet tube discharging at its upper end to the chamber defined by the casing, an outlet tube disposed within said inlet tube to discharge at its lower end, a filter cartridge comprising radially spaced outer and inner walls, said outer wall constituting a filtering wall, a top wall and an outer bottom wall, the inner wall being spaced from said inlet tube and coacting therewith to provide a discharge passage, said discharge passage having a delivery connection at its upper end to said outlet tube, an inner bottom wall spaced from said outer bottom wall, the space below said inner bottom wall being connected to said discharge passage, a sleeve disposed inwardly of said outer filtering wall and providing therewith an outer vertical passage opening at its lower end for passage of fluid to the space below said inner bottom member, a foraminate filtering chamber wall disposed inwardly of said sleeve and coacting therewith to provide a vertical distributing passage, a supply connection from the upper end of said chamber to the upper end of said distributing passage, and compacted filtering medium between said inner cartridge wall and said filtering chamber wall.

8. In a filter, the combination with a closed casing, of an inlet tube discharging at its upper end to the chamber defined by the casing, an outlet tube disposed within said inlet tube to discharge at its lower end, a filter cartridge comprising radially spaced foraminate outer and inner walls and top and bottom walls, the inner wall being spaced from said inlet tube and coacting therewith to provide a discharge passage, said discharge passage having a delivery connection at its upper end to said outlet tube, a filtering lining for said outer cartridge wall, a vertically corrugated sleeve disposed within said lining providing a plurality of outer vertical passages connected at their lower ends to said discharge passage, a foraminate filtering chamber wall disposed on the inner side of said sleeve and supported by the outwardly facing corrugations thereof against outward displacement and coacting with the inwardly facing corrugations thereof to provide a plurality of inner vertical distributing passages connected to said chamber, and compacted filtering medium between said inner cartridge wall and said filtering chamber wall.

9. In a filter, the combination with a chamber for circulated fluid, an inlet tube discharging to said chamber at its upper end and having a supply connection at its lower end, an outlet tube disposed within said inlet tube and having a discharge at its lower end, said outlet tube being provided with a pressure relief valve for said chamber, a filter cartridge comprising radially spaced foraminate inner and outer walls and top and bottom walls, the inner cartridge wall being spaced from said inlet tube and coacting therewith to provide a discharge passage, said discharge passage having a delivery connection to said outlet tube, a filtering lining of sheet material for said outer cartridge wall, said lining being composed of rayon and being of a texture to prevent passage of relatively large particles but to permit passage of relatively small particles, a vertically corrugated sleeve disposed within said lining and coacting therewith to provide a plurality of vertical discharge passages for the liquid passing through said lining, said passages being connected with their lower ends to the lower end of said discharge passage, a foraminated filtering chamber wall disposed on the inner side of said sleeve and supported by the outwardly facing corrugations thereof against outward displacement and coacting therewith to provide a plurality of inner vertical distributing passages, a supply connection for the upper ends of said distributing passages to said chamber, and unkiered cotton linters compacted in substantially uniform density between said inner cartridge wall and said filtering chamber wall.

10. In a filter, the combination with a chamber for circulated fluid, an inlet tube discharging to said chamber at its upper end and having a supply connection at its lower end, an outlet tube disposed within said inlet tube and having a discharge at its lower end, a filter cartridge comprising radially spaced inner and outer walls and top and bottom walls, said outer wall constituting a filtering wall, the inner cartridge wall being spaced from said inlet tube and coacting therewith to provide a discharge passage, said discharge passage having a delivery connection to said outlet tube, a sleeve disposed inwardly of said outer filtering wall and coacting therewith to provide an outer passage, a delivery connection between the lower end of said outer passage and the lower end of said discharge passage, a foraminated filtering chamber wall disposed on the inner side of said sleeve and coacting therewith to provide a distributing passage, a supply connection to the upper end of said distributing passage from the upper end of said chamber, a filtering medium between said inner cartridge wall and said filtering chamber wall.

11. In a filter, the combination with a chamber for fluid circulated under pressure and having a circulation inlet and an outlet tube discharging at its lower end, a filtering unit comprising radially spaced foraminate inner and outer walls, there being a discharge passage within said inner wall and a delivery connection to said outlet tube, a filtering lining for said outer wall, a corrugated wall member disposed within said outer wall and coacting with its said lining thereof to provide a plurality of passages, which passages are connected at their lower ends to said discharge passage, a foraminate filtering medium chamber wall disposed on the inner side of said corrugated wall member and coacting therewith to provide a plurality of distributing passages, said distributing passages having inlet connections to said chamber, and fibrous filtering medium of substantially uniform density between the said inner wall and said filtering chamber wall, the flow resistance of said filtering medium substantially exceeding that of the lining for said outer wall whereby the flow of fluid through the filter lining is substantially greater than that through the filter medium, said filter lining, contsituting means to filter only relatively large particles from the fluid, said filtering medium constituting means to filter relatively small particles from the fluid.

12. In a filter, the combination with a chamber for fluid under pressure and having an inlet and an outlet circulating connection, a filtering unit comprising radially spaced foraminate relatively fixed inner and outer walls, a filtering lining of fabric for said outer wall, said lining being composed of rayon and being of a texture to prevent passage of relatively large particles but to permit passage of relatively small particles, a corrugated wall member disposed within said outer lining wall and coacting therewith to provide a plurality of passages, a delivery connection from the lower ends of said passages to the outlet connection, a foraminate filtering medium chamber wall disposed on the inner side of said corrugated wall member and coacting therewith to provide a plurality of distributing passages having connections to said chamber, and unkiered cotton linters compacted in substantially uniform density between said inner wall and said filtering chamber wall.

13. In a filter, the combination with a chamber for fluid under pressure and having an inlet and an outlet circulating connection, a filtering unit comprising radially spaced foraminate relatively fixed inner and outer walls, a filtering lining for said outer wall, a corrugated wall member disposed within said outer lining wall and coacting therewith to provide a plurality of passages, a delivery connection from the lower ends of said passages to the outlet connection, a foraminate filtering medium chamber wall disposed on the inner side of said corrugated wall member and supported against outward displacement thereby and coacting therewith to provide a plurality of distributing passages having connections to said chamber, and a filtering medium between said inner wall and said filtering chamber wall.

14. In a filter, the combination with a chamber for fluids circulated therethrough under pressure and having inlet and outlet fluid circulating connections therein, a filtering unit comprising radially spaced foraminate inner and outer walls, a filtering lining of fabric for the outer wall, a corrugated wall member disposed within said lining and coacting therewith to provide a plurality of passages which passages are connected to said outlet connection, a foraminate filtering chamber wall disposed on the inner side of said wall member and coacting therewith to provide a plurality of distributing passages which passages are connected at one end to said chamber, and cotton linters compacted to substantially uniform density between said filtering chamber wall and said inner wall, the fluid passing through said linters being discharged to said outlet connection to mix with the fluid passing through said outer wall lining.

15. In a filter, the combination with a chamber for fluids circulated therethrough under pressure and having inlet and outlet fluid circulating connections, a filtering unit comprising radially spaced inner and outer walls, said outer wall constituting a filtering wall, a wall member disposed radially inwardly of said outer filtering wall and coacting therewith to provide a passage connected to said outlet connection, a foraminate filtering chamber wall disposed on the inner side of said wall member and coacting therewith to provide a distributing passage connected to said chamber for passage of fluid from the chamber into the distributing passage, and a filtering medium disposed between said filtering chamber wall and said inner wall, the flow resistance of said filtering medium in said filtering chamber substantially exceeding the flow resistance of the filtering outer wall whereby the flow of fluid through the filtering outer wall is substantially greater than that through the filtering medium, said filtering outer wall constituting means to filter only relatively large particles from the fluid, said filtering medium constituting means to filter relatively small particles from the fluid.

16. A filter cartridge for use in a filtering chamber having inlet and outlet circulating connections, said cartridge comprising radially spaced foraminate inner and outer walls and top and bottom walls connecting and supporting said inner and outer walls in fixed relation, a filtering lining of fabric for the outer wall, a wall member disposed radially inwardly of said outer lining and coacting therewith to provide a passage connected to said outlet connection, a foraminate filtering medium chamber wall disposed on the inner side of said wall member and coacting therewith to provide a distributing passage connected to said chamber for passage of fluid from the chamber into the distributing passage, unkiered cotton linters compacted in substantially uniform density between said inner cartridge wall and said filtering chamber wall, the flow resistance of said liners substantially exceeding that of said filtering lining whereby a relatively greater volume of liquid passes through the filtering lining than through the filtering medium.

17. A filter cartridge for use in a filtering chamber having inlet and outlet circulating connections, said cartridge comprising radially spaced inner and outer walls and top and bottom end walls connecting and supporting said inner and outer walls in fixed relation, said outer wall constituting a filtering wall, a corrugated wall member disposed within said outer filtering wall and coacting therewith to provide a plurality of passages connected at their lower ends to said outlet connection, a foraminate filtering medium chamber wall disposed on the inner side of said corrugated member and radially outwardly supported thereby and coacting therewith to provide a plurality of distributing passages, and a filtering medium compacted in substantially uniform density between said inner cartridge wall and said filtering chamber wall.

References Cited in the file of this patent

UNITED STATES PATENTS

| | | |
|---|---|---|
| 1,690,358 | Babitch | Nov. 6, 1928 |
| 1,910,771 | Knight | May 23, 1933 |
| 2,055,167 | Bertrotti | Sept. 22, 1936 |
| 2,271,054 | Williams | Jan. 27, 1942 |
| 2,301,121 | Kamrath | Nov. 3, 1942 |
| 2,429,321 | La Brecque | Oct. 21, 1947 |
| 2,533,266 | Kovacs et al. | Dec. 12, 1950 |
| 2,564,637 | Chase | Aug. 14, 1951 |